United States Patent
Suzuki et al.

(10) Patent No.: US 12,292,081 B2
(45) Date of Patent: May 6, 2025

(54) BALL BEARING

(71) Applicant: NSK LTD., Tokyo (JP)

(72) Inventors: Hironori Suzuki, Fujisawa (JP); Takuya Oyama, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/270,952

(22) PCT Filed: Feb. 21, 2022

(86) PCT No.: PCT/JP2022/006892
§ 371 (c)(1),
(2) Date: Jul. 5, 2023

(87) PCT Pub. No.: WO2022/209417
PCT Pub. Date: Oct. 6, 2022

(65) Prior Publication Data
US 2024/0052881 A1    Feb. 15, 2024

(30) Foreign Application Priority Data

Mar. 31, 2021  (JP) .................... 2021-062335

(51) Int. Cl.
*F16C 19/16* (2006.01)
*F16C 33/38* (2006.01)

(52) U.S. Cl.
CPC ........ *F16C 19/163* (2013.01); *F16C 33/3843* (2013.01); *F16C 33/3887* (2013.01)

(58) Field of Classification Search
CPC .............. F16C 19/163; F16C 33/3843; F16C 33/6651; F16C 33/3887
See application file for complete search history.

(56) References Cited

U.S. PATENT DOCUMENTS

2002/0186911 A1* 12/2002 Van Dine .............. F16C 33/605
384/523

FOREIGN PATENT DOCUMENTS

DE    2612272 A1 *  9/1977
JP    3-20723 U     2/1991
(Continued)

OTHER PUBLICATIONS

International Search Report (PCT/ISA/210) issued May 17, 2022 by the International Searching Authority in counterpart International Patent Application No. PCT/JP2022/006892.
(Continued)

*Primary Examiner* — James Pilkington
*Assistant Examiner* — Aimee Tran Nguyen
(74) *Attorney, Agent, or Firm* — Sughrue Mion, PLLC (57) ABSTRACT

A ball bearing includes an inner ring, an outer ring, a plurality of balls rollably disposed between an inner ring raceway surface of the inner ring and the outer ring raceway surface of the outer ring, and a cage in which pockets rollably holding the balls are formed at intervals in a circumferential direction. An inclination angle of a cylindrical surface of each of the pockets is set more than 0° and less than a contact angle of the ball bearing, the cylindrical surface and a corresponding ball are in contact with each other at an inner side in a cage thickness direction relative to a position where a rotation axis of the ball intersects with the cylindrical surface, and a space is formed at a portion from a contact position to a circumferential surface of the cage on a side closer to the intersection position.

2 Claims, 8 Drawing Sheets

(56) References Cited

FOREIGN PATENT DOCUMENTS

| JP | 2001-140870 A | | 5/2001 | |
|----|---------------|---|--------|---|
| JP | 2016118294 A | * | 6/2016 | ............. F16C 19/10 |
| JP | 2021-25613 A | | 2/2021 | |
| SU | 518583 A1 | | 6/1976 | |

OTHER PUBLICATIONS

Written Opinion (PCT/ISA/237) issued May 17, 2022 by the International Searching Authority in counterpart International Patent Application No. PCT/JP2022/006892.
European Extended Search Report issued Sep. 18, 2024 by the European Patent Office for EP Patent Application No. 22779644.8.

* cited by examiner

BALL BEARING

TECHNICAL FIELD

The present invention relates to a ball bearing.

BACKGROUND ART

For example, a ball bearing such as an angular contact ball bearing includes a cage guided by an inner diameter surface of an outer ring or an outer diameter surface of an inner ring, and a plurality of balls are rollably held in a plurality of pockets formed in the cage (see, for example, Patent Literature 1).

CITATION LIST

Patent Literature

Patent Literature 1: JP2001-140870A

SUMMARY OF INVENTION

Technical Problem

In the ball bearing, in order to reduce a decrease in bearing performance such as a bearing life, it is desired to secure a sufficient amount of lubricant in a contact portion between a cylindrical surface of the pocket of the cage and the corresponding ball.

However, as in the ball bearing described in Patent Literature 1, when an inclination angle formed by an axial direction of the pocket of the cage and a bearing radial direction is equal to a contact angle when an axial preload is applied to the bearing, a sufficient amount of lubricant is not secured in the contact portion between the cylindrical surface of the pocket of the cage and the ball, and there is a concern that the bearing performance may be deteriorated.

Accordingly, an object of the present invention is to provide a ball bearing capable of ensuring a sufficient amount of lubricant in a contact portion between a ball and a cylindrical surface of a pocket of a cage to reduce a decrease in bearing performance.

Solution to Problem

The present invention has the following configurations.
A ball bearing including:
an inner ring having an inner ring raceway surface in an outer circumference;
an outer ring having an outer ring raceway surface in an inner circumference;
a plurality of balls rollably disposed between the inner ring raceway surface and the outer ring raceway surface; and
a cage in which a plurality of pockets rollably holding the balls and having cylindrical surfaces are formed at intervals in a circumferential direction and which has a circumferential surface guided by an inner diameter surface of the outer ring or an outer diameter surface of the inner ring,
in which regarding each of the pockets, an inclination angle β of a corresponding one of the cylindrical surfaces is set more than 0° and less than a contact angle α of the ball bearing, and the cylindrical surface and a corresponding ball are in contact with each other at an inner side in a cage thickness direction relative to a position where a rotation axis of the ball intersects with the cylindrical surface, so that a space is formed at a portion from a contact position to the circumferential surface of the cage on a side closer to the intersection position.

Advantageous Effects of Invention

According to the present invention, it is possible to ensure a sufficient amount of lubricant in a contact portion between a ball and a cylindrical surface of a pocket of a cage, and to reduce a decrease in bearing performance.

BRIEF DESCRIPTION OF DRAWINGS

FIG. 2 is views showing a cage, in which (A) is a perspective view and (B) is a sectional view taken along the axial direction.

FIG. 3 is views showing a holding state of a ball in the cage, in which (A) is a perspective view seen from an outer circumferential side of the cage in a cross section along the axial direction at a pocket portion, and (B) is viewed from a direction of an arrow X in (A).

FIG. 5 is views showing a holding state of a ball in the cage according to Reference Example 1, in which (A) is a perspective view seen from an outer circumferential side of the cage in a cross section along the axial direction at a pocket portion, and (B) is viewed from a direction of an arrow Yin (A).

FIG. 7 is views showing a cage of another shape, in which (A) is a perspective view and (B) is a sectional view taken along an axial direction.

FIG. 8 is views showing a cage of still another shape, in which (A) is a perspective view and (B) is a sectional view taken along an axial direction.

DESCRIPTION OF EMBODIMENTS

Hereinafter, an embodiment of the present invention will be described in detail with reference to the drawings.

Figure 1:
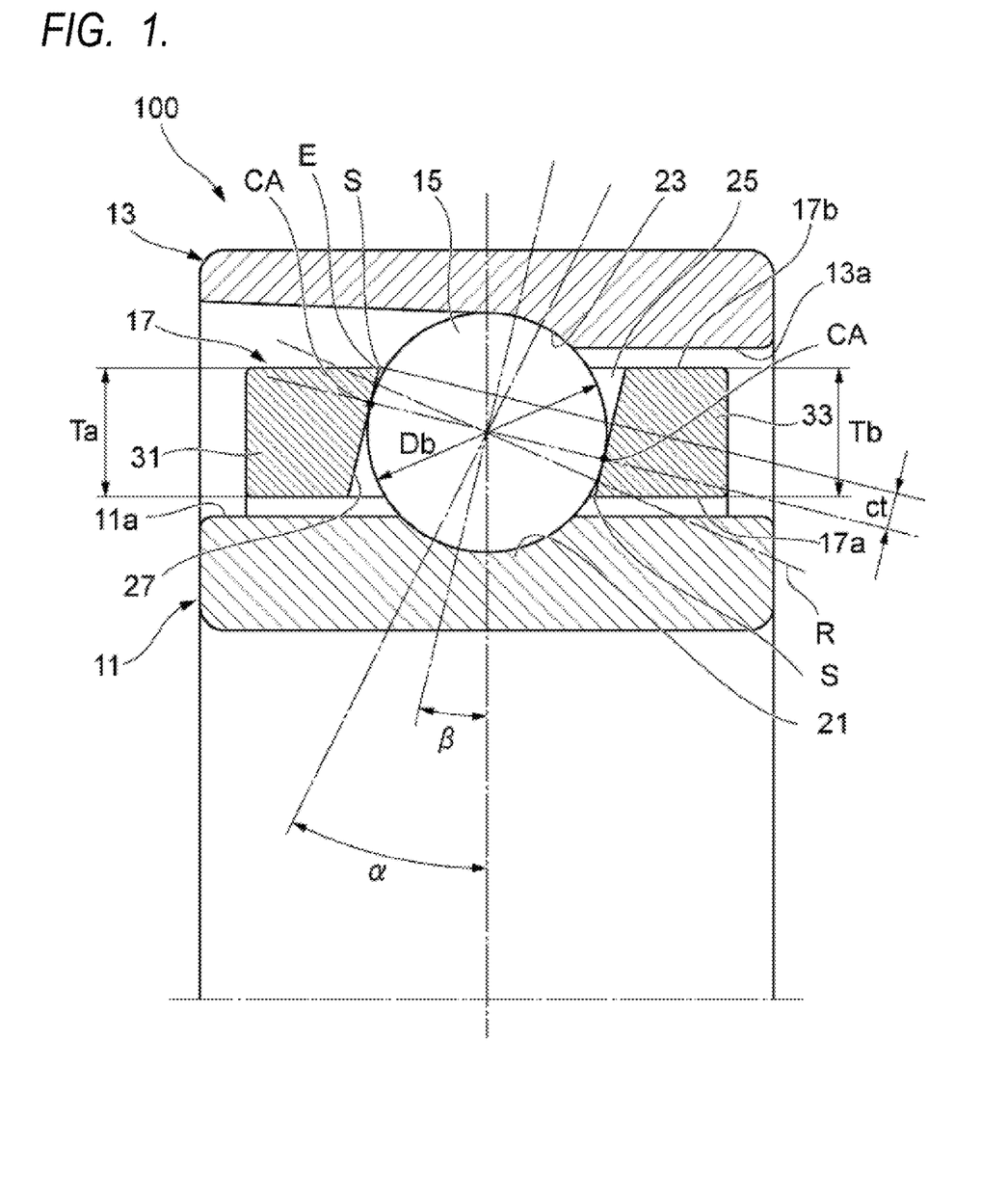
FIG. 1 is a partial sectional view of a ball bearing according to a configuration example of the present invention along an axial direction.

FIG. 1 is a partial sectional view of a ball bearing 100 according to a configuration example of the present invention along an axial direction.

As shown in FIG. 1, the ball bearing 100 according to the present embodiment includes an inner ring 11, an outer ring 13, balls 15, and a cage 17. The ball bearing 100 is suitably used, for example, as a bearing for a shaft that is rotated at a high speed in a dental air turbine, a cleaner, a turbocharger, or the like.

The inner ring 11 has an inner ring raceway surface 21 on an outer circumference, and the outer ring 13 has an outer ring raceway surface 23 on an inner circumference. A plurality of balls 15 are disposed between the inner ring raceway surface 21 and the outer ring raceway surface 23. The cage 17 has a plurality of pockets 25. The balls 15 are accommodated in the pockets 25, and the balls 15 are rollably held in the pockets 25. The ball 15 held in the pocket 25 of the cage 17 is rollable at a contact angle α between the inner ring raceway surface 21 and the outer ring raceway surface 23 when an axial preload is applied. The ball 15, which is freely rollable at the contact angle α, revolves while rotating about a rotation axis R orthogonal to the contact angle α. The contact angle α of the ball bearing 100 is an angle formed by a normal line at a contact point between the ball 15 and the outer ring 13 (or the inner ring 11) and a plane perpendicular to an axis of the ball bearing 100.

In addition, the outer diameter surface 11a of the inner ring 11 has the same outer diameter on both sides in the axial direction across the inner ring raceway surface 21, that is, on one side and the other side.

Figure 2A:
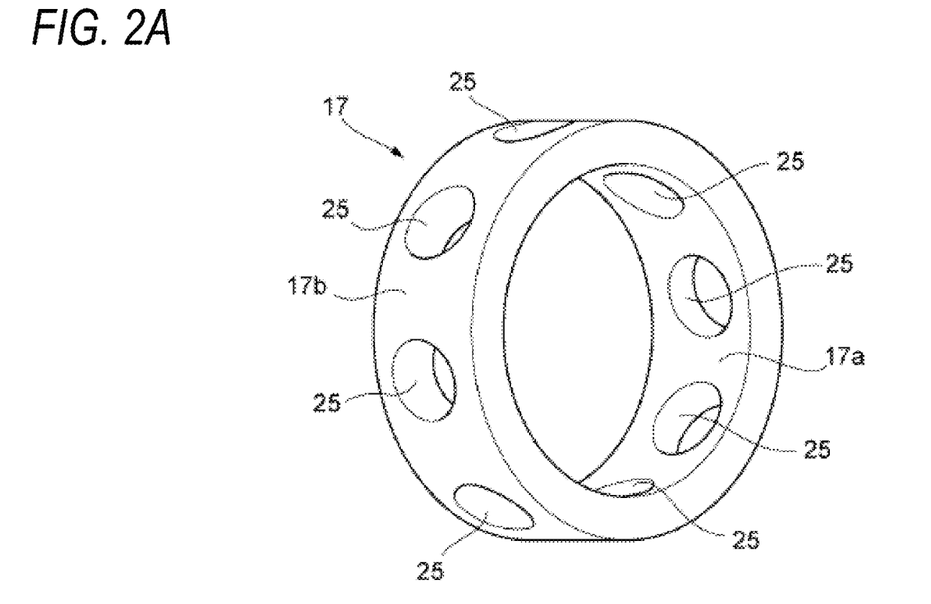
Figure 2B:
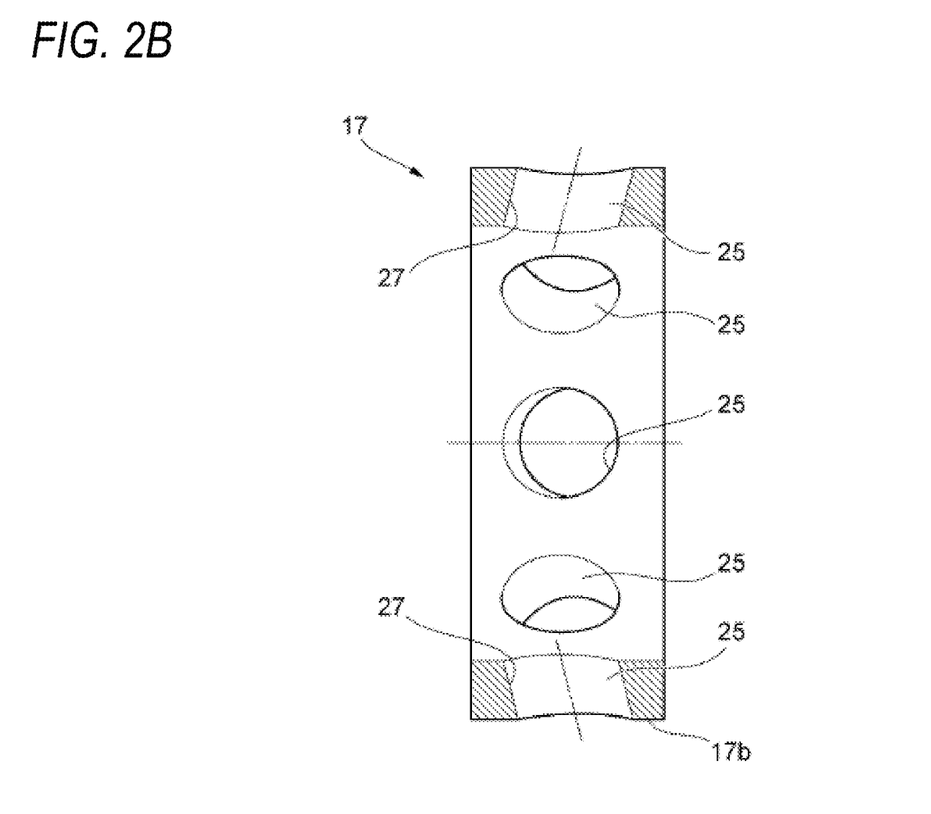

As shown in (A) and (B) of FIG. 2, the cage 17 is formed in an annular shape, and the plurality of pockets 25 are formed at intervals in a circumferential direction. The cage 17 is made of, for example, metal or synthetic resin. In the cage 17, the cylindrical pockets 25 are penetrated from front to back, and the pockets 25 each have a cylindrical surface 27. Note that the number of the pockets 25 and the number of the balls 15 do not necessarily have to coincide with each other. In addition, the cage 17 may be any one of a hollow die in which the pockets 25 are formed by machining, a punching die obtained by punching a metal plate with a die, and a molded product molded by a resin being poured into a mold. When an inner diameter of the pocket 25 of the cage 17 is 1.03 to 1.2 times an outer diameter of the ball 15, high-speed rotation performance can be satisfied.

As shown in FIG. 1, an inner circumferential surface 17a of the cage 17 has the same inner diameter on one side 31 in the axial direction and on the other side 33 in the axial direction. Further, in the cage 17, a thickness Ta in a radial direction on the one side 31 in the axial direction and a thickness Tb in the radial direction on the other side 33 in the axial direction have the same dimension.

The cage 17 of the present embodiment may be an inner ring guide type cage in which the inner circumferential surface 17a is guided by the outer diameter surfaces 11a on both sides in the axial direction with respect to the inner ring raceway surface 21 of the inner ring 11. In this case, the inner circumferential surface 17a of the cage 17 is guided by the outer diameter surface 11a of the inner ring 11 having the same outer diameter on both sides in the axial direction with the inner ring raceway surface 21 interposed therebetween. The inner circumferential surface 17a of the cage 17 guided by the outer diameter surface 11a of the inner ring 11 has the same inner diameter on the one side 31 in the axial direction and on the other side 33 in the axial direction. Therefore, the cage 17 guided by the outer diameter surface 11a of the inner ring 11 is less likely to be inclined with respect to the inner ring 11. Further, in the cage 17, the thickness Ta in the radial direction on the one side 31 in the axial direction and the thickness Tb in the radial direction on the other side 33 in the axial direction have the same dimension. As a result, the cage 17 guided by the outer diameter surface 11a of the inner ring 11 has a uniform balance in the axial direction, and is less likely to be inclined with respect to the inner ring 11.

In addition, the cage 17 may be an outer ring guide type cage in which an outer circumferential surface 17b is guided by an inner diameter surface 13a of a shoulder portion of the outer ring 13. Further, although not shown, an inner circumferential surface of the outer ring has the same diameter on both sides in the axial direction with the outer ring raceway surface interposed therebetween and the cage 17 may be an outer ring guided type cage which is guided by the inner circumferential surface of the outer ring. In this case, by using a crown-shaped case, by reducing a difference between a diameter of the outer ring raceway surface 23 and a diameter of the inner diameter surface 13a of the shoulder portion of the outer ring 13, or by reducing a difference between a diameter of the inner ring raceway surface 21 and a diameter of one or both sides of the outer diameter surface 11a of the inner ring 11, the ball bearing 100 can be easily assembled. This also applies to a cage to be described below.

As shown in FIG. 1, in the cage 17, the cylindrical surface 27 of each pocket 25 is inclined at an inclination angle β larger than 0 degrees. The ball 15 in the pocket 25 has contact points CA with the cylindrical surface 27 at which a plane passing through the center of the ball 15 and orthogonal to the inclination angle β intersects with respect to the cylindrical surface 27. The inclination angle β of the cylindrical surface 27 is the same for all the pockets 25.

The inclination angle β of the cylindrical surface 27 is smaller than the contact angle α of the ball 15 when an axial preload is applied. That is, the inclination angle β of the cylindrical surface 27 of the pocket 25 is an angle satisfying the following formula (1).

$$0° < \beta < \alpha \tag{1}$$

When the inclination angle β of the cylindrical surface 27 of the pocket 25 (the angle formed by the radial direction of the cage 17 in an axial cross section of the bearing and a central axis of the cylindrical surface 27) is larger than 0° as in the above formula (1), the contact points CA between the ball 15 and the cylindrical surface 27 are close to the rotation axis R of the ball 15, and thus the ball 15 comes into contact with the pocket 25 at positions where a rotation circumferential speed of the ball 15 is relatively small. In the cage 17, a ratio Ct/db of a dimension Ct between the contact point CA and the nearest end E of the pocket 25 to a diameter db of the ball 15 is preferably 0.05 or more and 0.4 or less. Here, the dimension Ct represents a length along the central axis of the cylindrical surface 27. That is, the ratio Ct/db of the dimension Ct between the contact point CA and the nearest end E of the pocket 25 to the diameter db of the ball 15 preferably satisfies the following formula (2).

$$0.05 \leq Ct/db \leq 0.4 \tag{2}$$

When the ratio Ct/db of the dimension Ct between the contact point CA and the nearest end E of the pocket 25 to the diameter db of the ball is set to 0.05 or more and 0.4 or less as in the above formula (2), a narrow region between the ball 15 and the cylindrical surface 27 of the pocket 25 can be secured around the contact point CA at which the ball 15 and the cylindrical surface 27 of the pocket 25 come into contact with each other. Therefore, it is possible to sufficiently secure a lubricant at the contact point CA at which the ball 15 and the cylindrical surface 27 of the pocket 25 come into contact with each other.

Further, since the inclination angle β of the cylindrical surface 27 of the pocket 25 is smaller than the contact angle α as in the above formula (1), a space S from the contact point CA between the ball 15 and the cylindrical surface 27 to a circumferential surface on a side close to the cage 17 is widened.

Figure 3A:
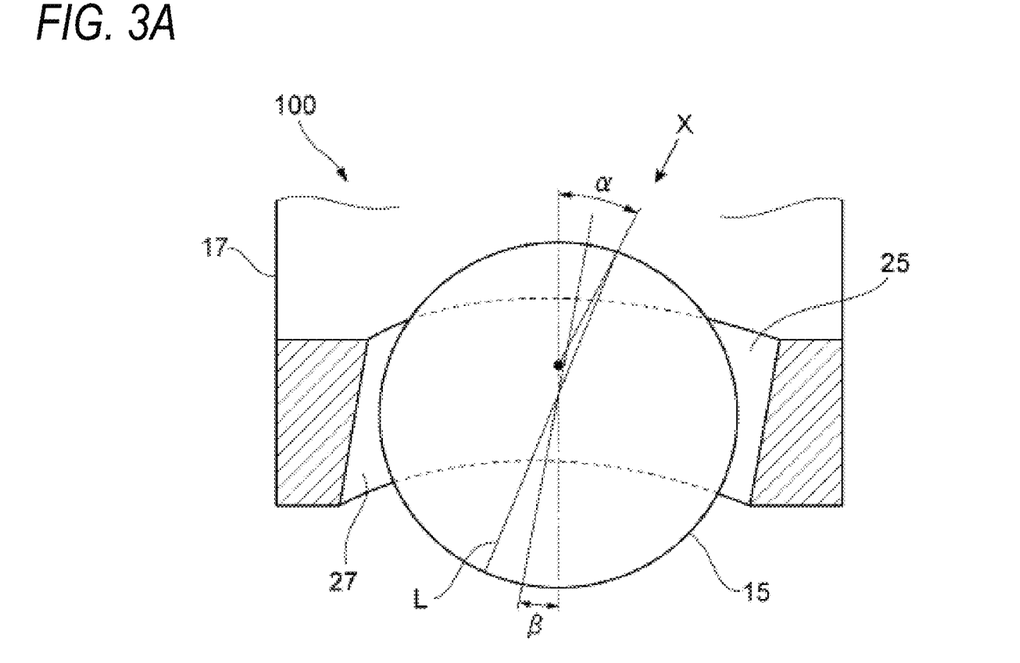
Figure 3B:
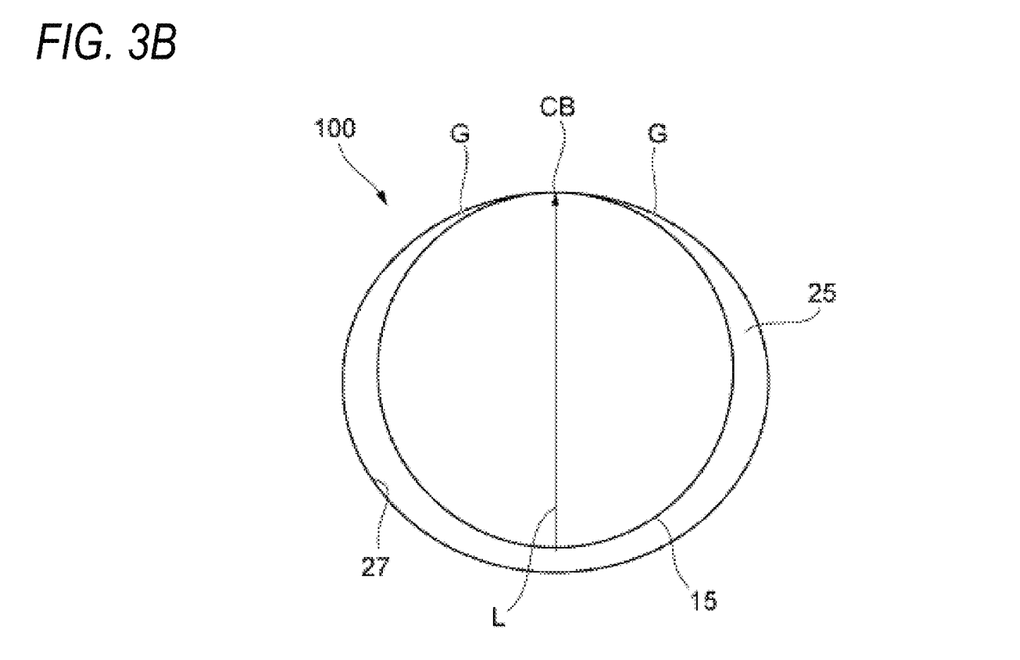

As shown in (A) of FIG. 3, the cylindrical surface 27 of the pocket 25 of the cage 17 is inclined at the inclination angle β with respect to the radial direction of the cage 17. Therefore, as shown in (B) of FIG. 3, when viewed from an outer circumferential side or an inner circumferential side along a running line L of the ball 15 inclined at the contact angle α, a balanced gap G is provided on both sides of a contact portion CB between the pocket 25 and the ball 15.

Here, Reference Example 1 will be described.

Figure 4:
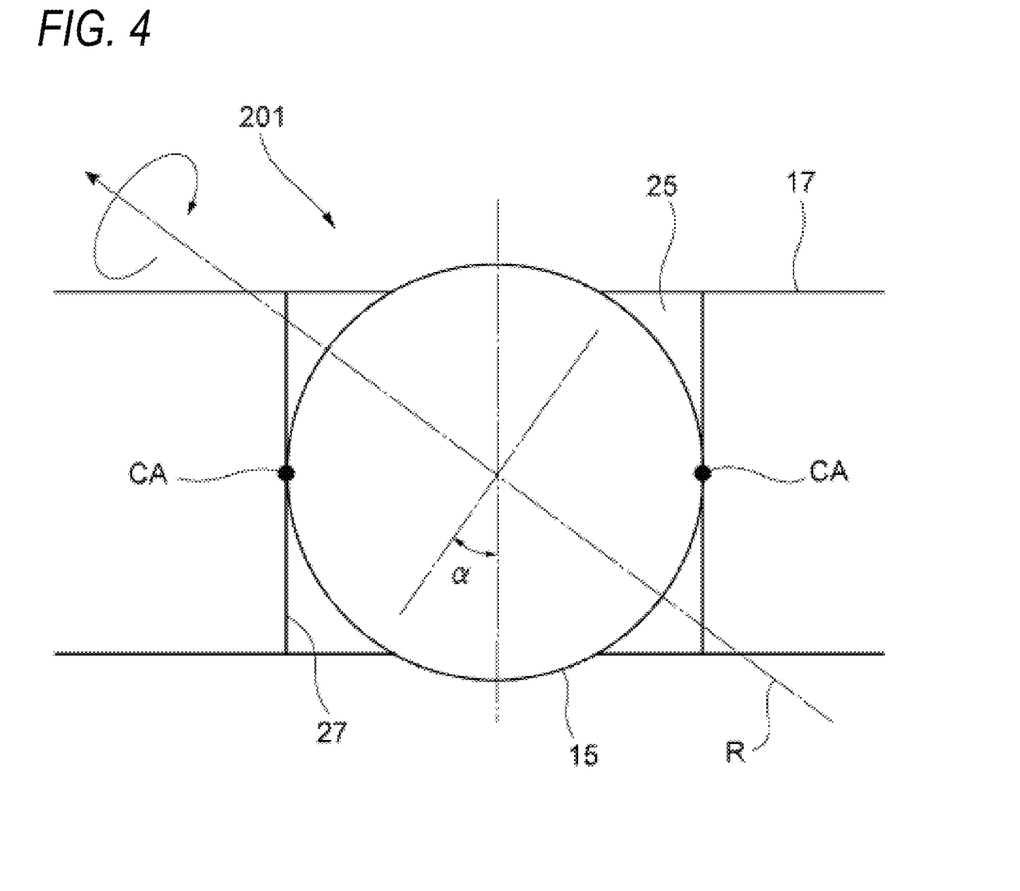
FIG. 4 is a schematic sectional view taken along an axial direction of a cage showing a holding state of a ball in a pocket of a ball bearing according to Reference Example 1.

A ball bearing 201 according to Reference Example 1 shown in FIG. 4 is a general ball bearing in which a central axis of the pocket 25 of the cage 17 is parallel to the central axis along the radial direction of the cage 17. In the ball bearing 201, the contact points CA between the cylindrical surface 27 of the pocket 25 and the ball 15 is located at positions far away from the rotation axis R. That is, the ball 15 and the cylindrical surface 27 of the pocket 25 of the cage 17 come into contact with each other at positions where the rotation circumferential speed is high.

For this reason, in the ball bearing 201 according to Reference Example 1, there is a concern that an increase in sliding friction between the balls 15 and the cage 17, a decrease in rotational torque, heat generation between the balls 15 and the cage 17, shortening of the life of the lubricant due to the heat generation, wear of the cage 17, generation of vibration of the cage 17, and the like may occur.

In contrast, according to the ball bearing 100 of the present configuration example, the inclination angle β of the cylindrical surface 27 of the pocket 25 is larger than 0°, so that the contact points CA between the ball 15 and the cylindrical surface 27 are close to the rotation axis R of the ball 15, and thus are located at positions where the rotation circumferential speed of the ball 15 is relatively small (see FIG. 1). Therefore, it is possible to obtain a greater effect of improving the bearing performance, such as a reduction in sliding friction between the balls 15 and the cage 17, a reduction in rotational torque, a reduction in heat generation between the balls 15 and the cage 17, an extension of the life of the lubricant due to the reduction in heat generation, a reduction in wear of the cage 17, and a reduction in vibration of the cage. In order to obtain a greater effect of improving the bearing performance, it is preferable that 3°<β, and it is more preferable that 5°<β.

Figure 5A:
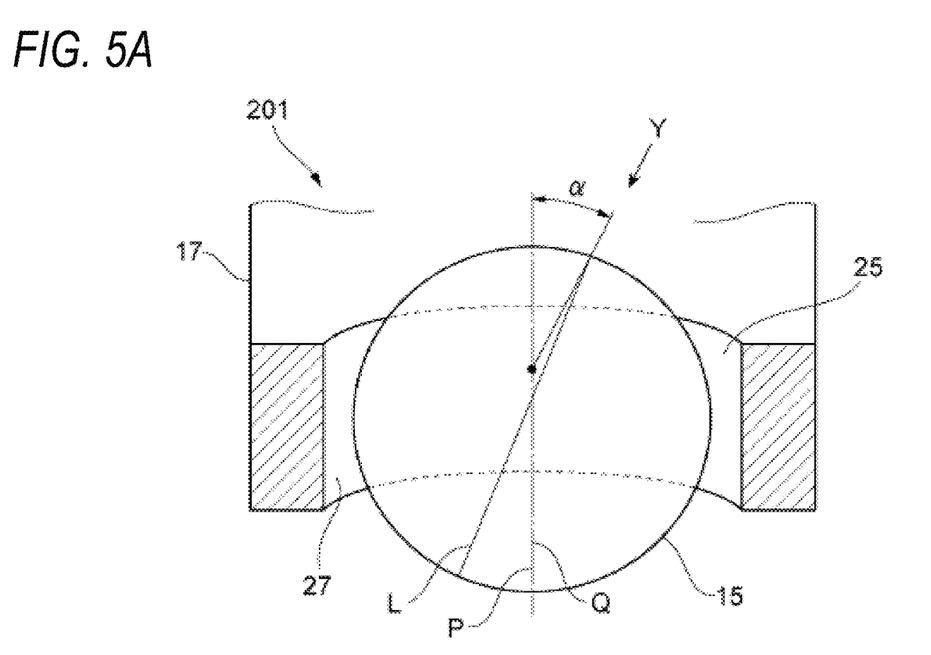
Figure 5B:
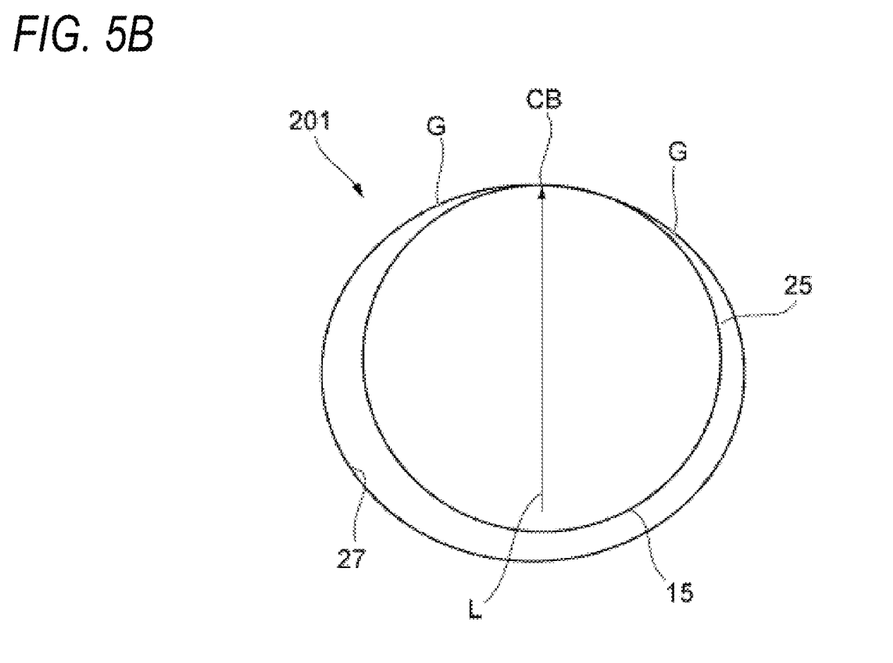

As shown in (A) of FIG. 5, in the ball bearing 201 according to the Reference Example 1, a central axis P of the pocket 25 of the cage 17 is parallel to a central axis Q along the radial direction of the cage 17 (coincides with the case shown in FIG. 5). Therefore, as shown in (B) of FIG. 5, when viewed from the outer circumferential side or the inner circumferential side along the running line L of the ball 15 inclined at the contact angle α, the gaps G on both sides of the contact portion CB between the pocket 25 and the ball 15 are different. As a result, lubrication by the lubricant between the ball 15 and the cylindrical surface 27 of the pocket 25 of the cage 17 becomes unstable, and there is a concern that the cage 17 may vibrate and that rotation balance of the cage 17 may be lost.

In contrast, according to the ball bearing 100 of the present configuration example, in the cage 17, since the cylindrical surface 27 of the pocket 25 is inclined at the inclination angle β, the balanced and nearly uniform gap G is provided on both sides of the contact portion CB between the pocket 25 and the ball 15 when viewed from the running line of the ball 15 (see (A) and (B) of FIG. 3). As a result, good lubrication by the lubricant between the ball 15 and the cylindrical surface 27 of the pocket 25 of the cage 17 is possible, occurrence of vibration of the cage 17 is reduced, and the cage 17 is rotated in a balanced manner.

Next, Reference Example 2 will be described.

Figure 6:
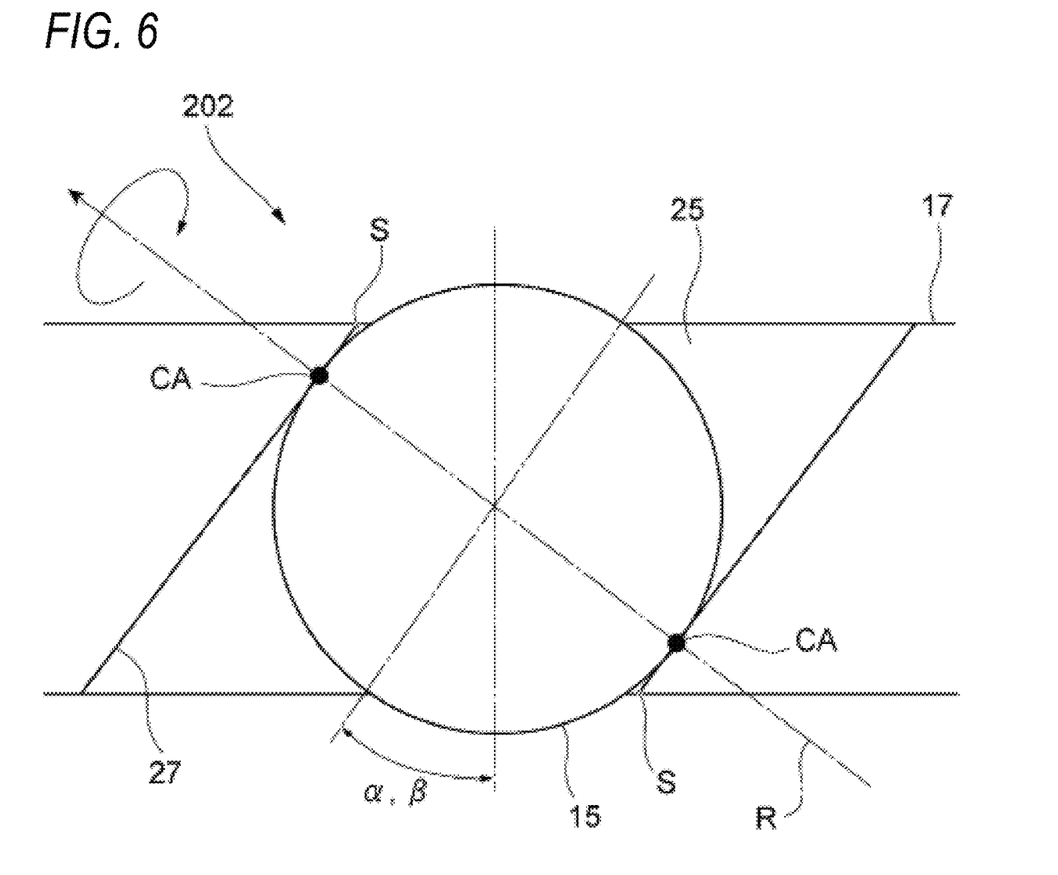
FIG. 6 is a schematic sectional view taken along an axial direction of a cage showing a holding state of a ball in a pocket of a ball bearing according to Reference Example 2.

As shown in FIG. 6, in a ball bearing 202 according to Reference Example 2, the inclination angle β of the pocket 25 of the cage 17 is equal to the contact angle α when an axial preload is applied. In the ball bearing 202, the space S from the contact point CA between the ball 15 and the cage 17 to a circumferential surface on a side close to the cage 17 is narrowed. As a result, a sufficient amount of lubricant is not secured at the contact portion between the cylindrical surface 27 of the pocket 25 of the cage 17 and the ball 15, which may lead to a decrease in bearing performance.

In contrast, according to the ball bearing 100 of the present configuration example, since the inclination angle β of the cylindrical surface 27 of the pocket 25 is smaller than the contact angle α, the space S from the contact point CA between the ball 15 and the cylindrical surface 27 of the pocket 25 of the cage 17 to the circumferential surface on the side close to the cage 17 is widened (see FIG. 1). As a result, the lubricant can be sufficiently secured at the contact point CA between the ball 15 and the cage 17, and it is possible to obtain the effect of improving the bearing performance, such as a reduction in sliding friction between the balls 15 and the pockets 25 of the cage 17, a reduction in rotational torque, a reduction in heat generation between the balls 15 and the cage 17, an extension of the life of the lubricant due to the reduction in heat generation, a reduction in wear of the cage 17, and a reduction in vibration of the cage. In order to obtain a greater effect of improving the bearing performance by the lubricant, it is preferable that (α−3°)>β, and it is more preferable that (α−5°)>β.

In the above embodiment, a structure including the cage 17 in which the cylindrical pockets 25 are penetrated from front and back is exemplified, but a shape of the cage 17 is not limited to the shape including the cylindrical pockets 25 penetrating through the front and the back.

Figure 7A:
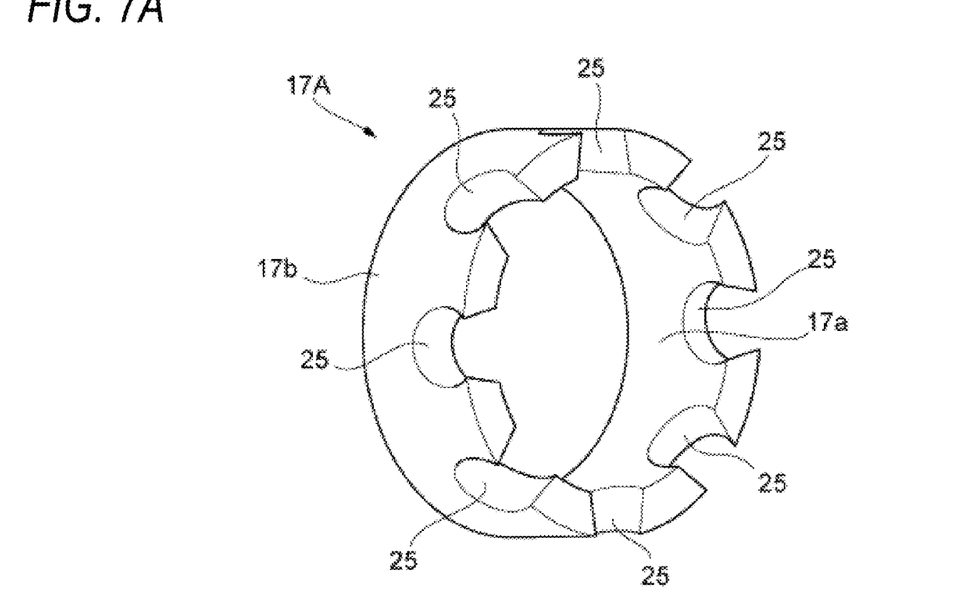
Figure 7B:
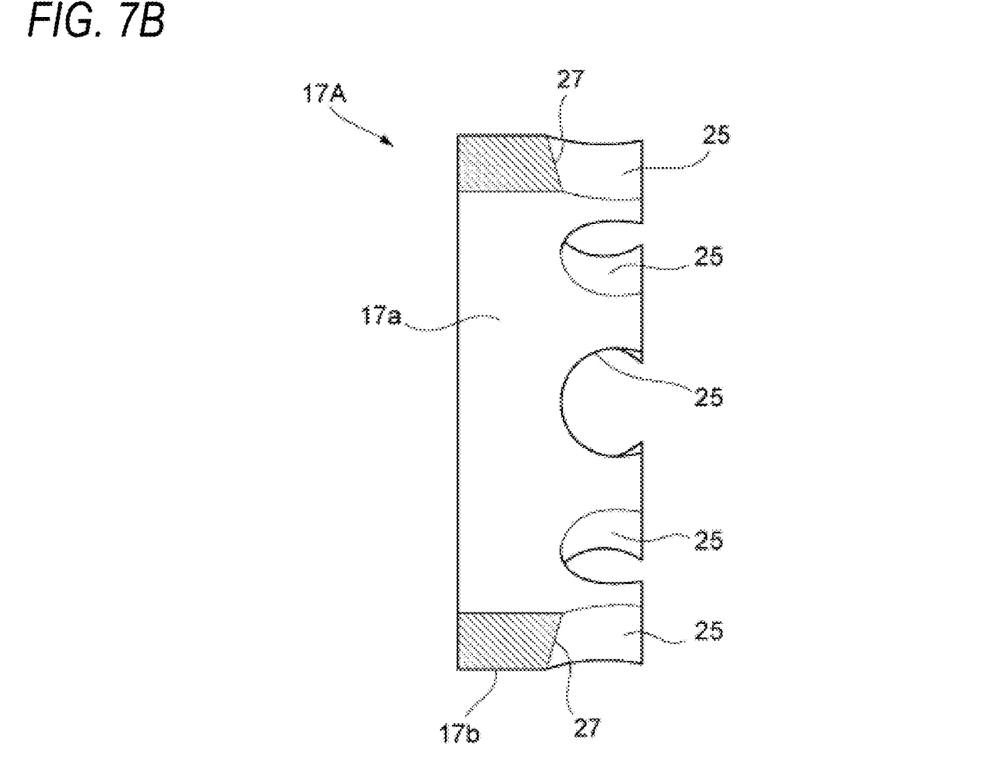
Figure 8A:
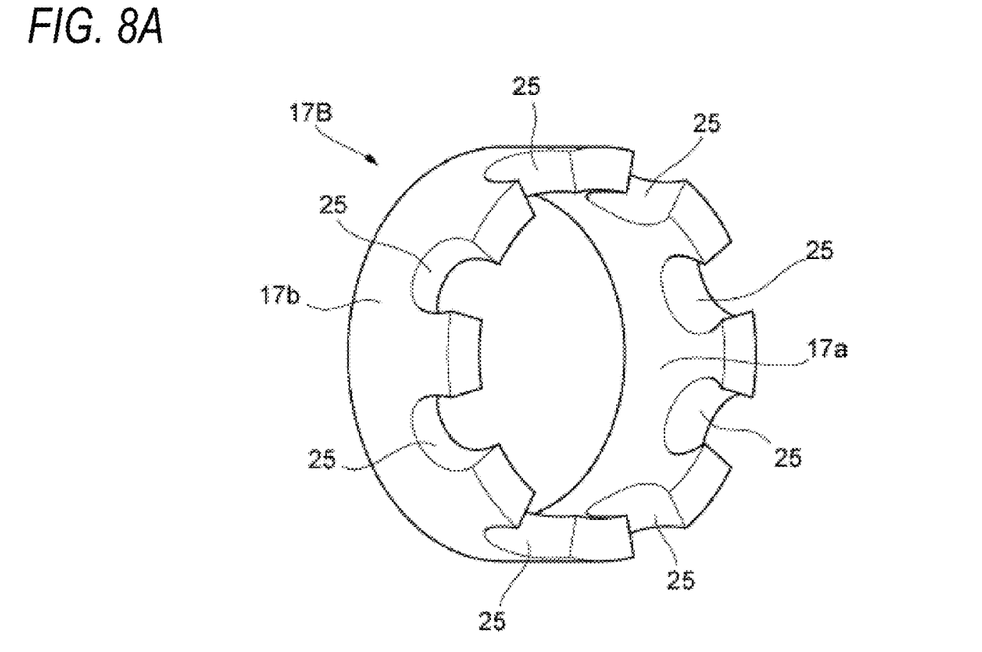
Figure 8B:
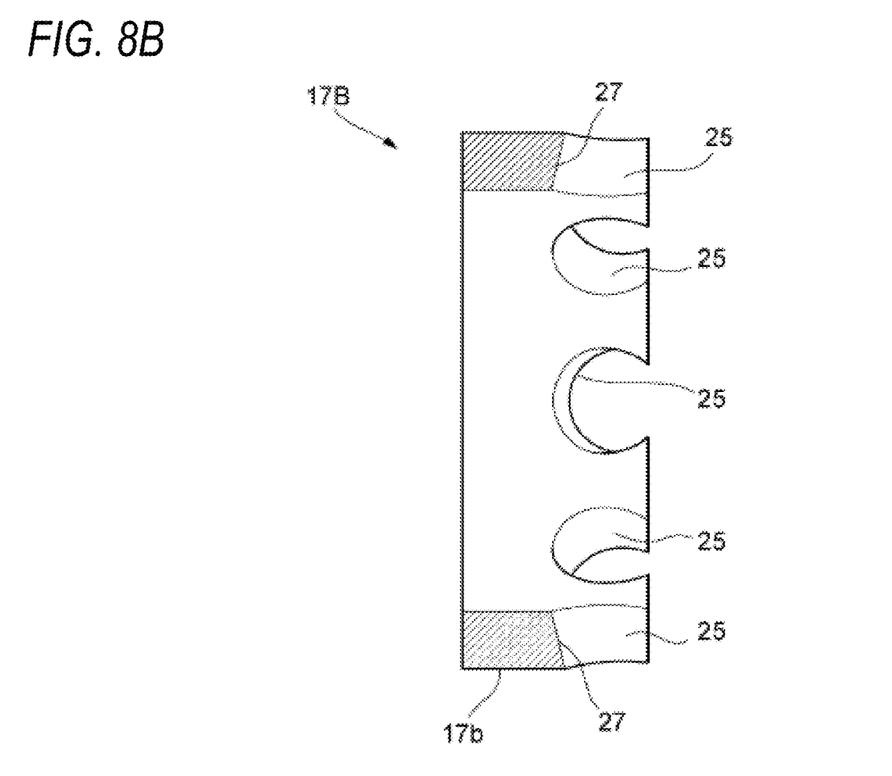

For example, as shown in (A) and (B) of FIG. 7, the cage may be a crown-type cage 17A in which the pockets 25 are open at one circumferential edge. In addition, a cage 17B shown in (A) and (B) of FIG. 8 is a crown-type cage in which the cylindrical surface 27 of the pocket 25 is inclined at the inclination angle β in a direction away from the opened one circumferential edge toward the outer circumferential side.

In the cages 17A and 17B, since the inclination angle β of the cylindrical surface 27 of the pocket 25 is also larger than 0° and smaller than the contact angle α of the ball 15 when an axial preload is applied, the contact point CA between the ball 15 and the cylindrical surface 27 can be disposed at a position where the rotation circumferential speed of the ball 15 is relatively small, and a space SA from the contact point CA between the ball 15 and the cylindrical surface 27 to the circumferential surface on a side close to the cages 17A and 17B can be widened.

In addition, the ball bearing 100 of the present configuration example may be a deep groove ball bearing, an angular contact bearing, or the like, and the type, size, and internal specifications are not limited.

As described above, the present invention is not limited to the embodiment described above, and combinations of the respective configurations of the embodiment and modifications and applications made by those skilled in the art based on the description of the specification and well-known techniques are also intended by the present invention and are included in the scope of the protection.

As described above, the following matters are disclosed in the present description.

(1) A ball bearing including:
an inner ring having an inner ring raceway surface in an outer circumference;
an outer ring having an outer ring raceway surface in an inner circumference;

a plurality of balls rollably disposed between the inner ring raceway surface and the outer ring raceway surface; and a cage in which a plurality of pockets rollably holding the balls and having cylindrical surfaces are formed at intervals in a circumferential direction and which has a circumferential surface guided by an inner diameter surface of the outer ring or an outer diameter surface of the inner ring, in which regarding each of the pockets, an inclination angle $\beta$ of a corresponding one of the cylindrical surfaces is set more than 0° and less than a contact angle $\alpha$ of the ball bearing, and the cylindrical surface and a corresponding ball are in contact with each other at an inner side in a cage thickness direction relative to a position where a rotation axis of the ball intersects with the cylindrical surface, so that a space is formed at a portion from a contact position to the circumferential surface of the cage on a side closer to the intersection position.

According to the ball bearing, since the inclination angle $\beta$ of the cylindrical surface of the pocket is larger than 0°, the ball and the pocket are brought into contact with each other at a position where the rotation circumferential speed of the ball is relatively small.

In addition, the inclination angle $\beta$ of the cylindrical surface of the pocket is smaller than the contact angle $\alpha$ of the ball when an axial preload is applied, so that the space from the contact portion between the ball and the cage to the nearest circumferential surface of the cage is widened, and a sufficient amount of lubricant can be secured in the contact portion between the ball and the cage.

As a result, it is possible to obtain an effect of improving the bearing performance, such as a reduction in sliding friction between the balls and the cage, a reduction in rotational torque, a reduction in heat generation between the balls and the cage, an extension of the life of the lubricant due to the reduction in heat generation, a reduction in wear of the cage, and a reduction in vibration of the cage.

(2) In the ball bearing according to (1), the inner diameter surface of the outer ring or the outer diameter surface of the inner ring that guides the cage has the same diameter on both sides in an axial direction across the outer ring raceway surface or the inner ring raceway surface, and an outer circumferential surface of the cage guided by the inner diameter surface of the outer ring or an inner circumferential surface of the cage guided by the outer diameter surface of the inner ring has the same diameter on one side in the axial direction and the other side in the axial direction.

According to the ball bearing, the cage guided by the inner diameter surface of the outer ring or the outer diameter surface of the inner ring is less likely to incline with respect to the outer ring or the inner ring.

(3) In the ball bearing according to (2), a radial thickness of the cage on the one side in the axial direction is equal to a radial thickness of the cage on the other side in the axial direction.

According to the ball bearing, the balance in the axial direction of the cage guided by the inner diameter surface of the outer ring or the outer diameter surface of the inner ring is made uniform, and the cage is less likely to incline with respect to the outer ring or the inner ring.

The present application is based on Japanese Patent Application No. 2021-62335 filed on Mar. 31, 2021, the contents of which are incorporated herein by reference.

REFERENCE SIGNS LIST

11 inner ring
11a outer diameter surface
13 outer ring
13a inner diameter surface
15 ball
17, 17A, 17B cage
17a inner circumferential surface
17b outer circumferential surface
21 inner ring raceway surface
23 outer ring raceway surface
25 pocket
27 cylindrical surface
31 one side
33 the other side
100 ball bearing
Ta, Tb thickness
$\alpha$ contact angle
$\beta$ inclination angle

The invention claimed is:

1. A ball bearing comprising:

an inner ring having an inner ring raceway surface in an outer circumference;

an outer ring having an outer ring raceway surface in an inner circumference;

a plurality of balls rollably disposed between the inner ring raceway surface and the outer ring raceway surface; and a cage in which a plurality of pockets rollably holding the balls and having cylindrical surfaces are formed at intervals in a circumferential direction and which has a circumferential surface guided by an inner diameter surface of the outer ring or an outer diameter surface of the inner ring, wherein regarding each of the pockets, an inclination angle $\beta$ of a corresponding one of the cylindrical surfaces is set more than 0° and less than a contact angle $\alpha$ of the ball bearing, and the cylindrical surface and a corresponding ball are in contact with each other at an inner side in a cage thickness direction relative to a position where a rotation axis of the ball intersects with the cylindrical surface at an intersection position, so that a space is formed at a portion from a contact position to the circumferential surface of the cage on a side closer to the intersection position, wherein the inner diameter surface of the outer ring or the outer diameter surface of the inner ring that guides the cage has the same diameter on both sides in an axial direction across the outer ring raceway surface or the inner ring raceway surface, and wherein an outer circumferential surface of the cage guided by the inner diameter surface of the outer ring or an inner circumferential surface of the cage guided by the outer diameter surface of the inner ring has the same diameter on one side in the axial direction and an other side in the axial direction.

2. The ball bearing according to claim 1, wherein a radial thickness of the cage on the one side in the axial direction is equal to a radial thickness of the cage on the other side in the axial direction.

* * * * *